United States Patent [19]

Mauz

[11] Patent Number: 5,672,254
[45] Date of Patent: Sep. 30, 1997

[54] CONTACT ELEMENT FOR TRANSMITTING CURRENT TO A WORKPIECE FOR USE IN ELECTROCHEMICAL MATERIAL WORKING

[75] Inventor: Wolfgang Mauz, Leinfelden-Echterdingen, Germany

[73] Assignee: Robert Bosch GmbH, Stuttgart, Germany

[21] Appl. No.: 687,609

[22] PCT Filed: Dec. 7, 1995

[86] PCT No.: PCT/DE95/01744

§ 371 Date: Aug. 8, 1996

§ 102(e) Date: Aug. 8, 1996

[87] PCT Pub. No.: WO96/20804

PCT Pub. Date: Jul. 11, 1996

[30] Foreign Application Priority Data

Jan. 3, 1995 [DE] Germany .................. 195 00 042.0

[51] Int. Cl.[6] .................................................. B23H 11/00
[52] U.S. Cl. ................................................ 204/279
[58] Field of Search ............................ 204/279, 286, 204/224 M

[56] References Cited

U.S. PATENT DOCUMENTS

| | | | |
|---|---|---|---|
| 3,869,373 | 3/1975 | Schacher et al. | 204/224 M |
| 4,116,799 | 9/1978 | Gosger et al. | 204/224 M |
| 4,160,717 | 7/1979 | Nauaro et al. | 204/224 M X |
| 4,422,918 | 12/1983 | Inoue | 204/279 X |
| 4,765,877 | 8/1988 | Leuy et al. | 204/279 X |

*Primary Examiner*—Donald R. Valentine
*Attorney, Agent, or Firm*—Spencer & Frank

[57] ABSTRACT

A contact element for transmitting current to a workpiece for use in electrochemical material working. The contact element (10) encompasses a contact carrier (11) and a contact piece (13) which is secured to the contact carrier (11) and comes in contact with the workpiece during operation. The contact carrier (11) comprises zirconium or a zirconium alloy. The contact piece (13) is a solid disk of platinum or a platinum alloy, and is welded to the end face (14) of the contact carrier (11).

5 Claims, 1 Drawing Sheet

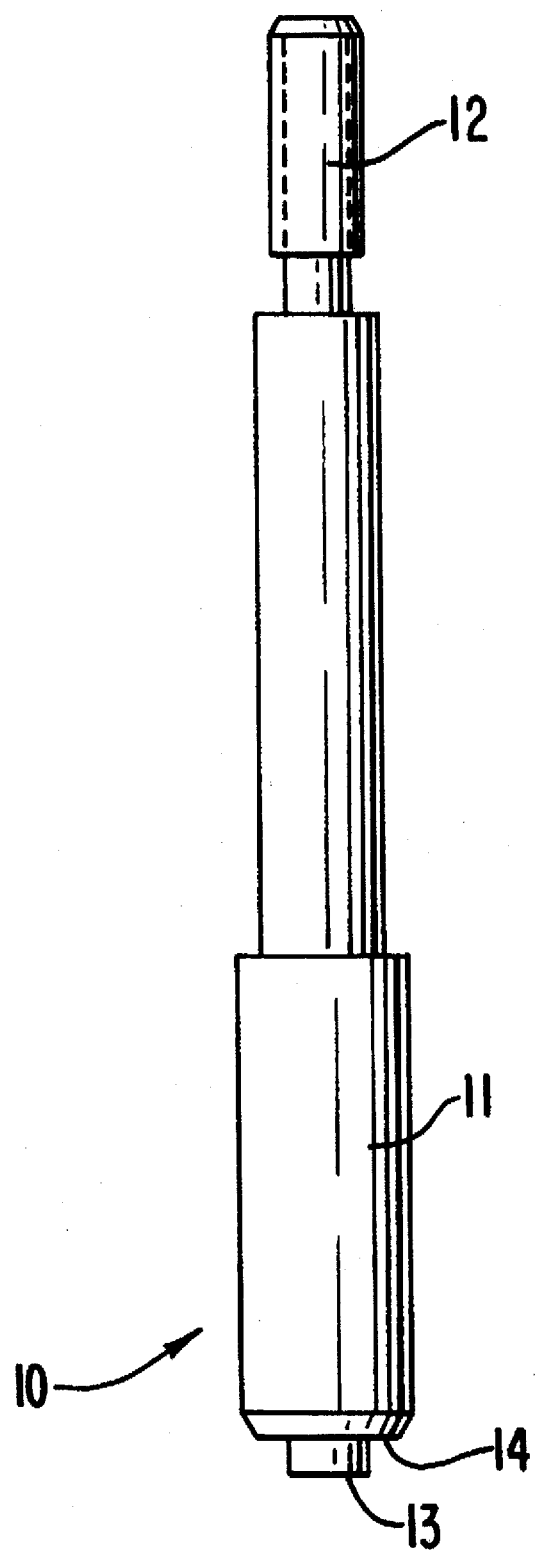

CONTACT ELEMENT FOR TRANSMITTING CURRENT TO A WORKPIECE FOR USE IN ELECTROCHEMICAL MATERIAL WORKING

STATE OF THE ART

The invention is based on a contact element for transmitting current to a workpiece for use in electrochemical material working, as defined in the preamble to the main claim.

It is known that, in electrochemical working of workpieces, a high-density current flows from a positively-polarized workpiece, via an electrolyte located in the work gap, to the negatively-polarized workpiece electrode. The supply of the current to the workpiece is effected by way of contact elements that are in contact with the workpiece during a working period. Perfect contacting is imperative during this process, because operating currents of a few 100 Amperes must be transmitted from the contact elements to the workpiece.

DE-GM 75 08 024 refers to a contact element for contacting workpieces which is configured to have a copper contact carrier and a platinum contact piece, with the contact piece being an extruded molded part attached to the contact carrier by means of hard soldering. Following the hard soldering, the contact carrier is extrusion-coated with a thermoplastic synthetic material in order to protect it against anodic stripping. This measure is necessary because the contact carrier also comes in contact with the electrolyte, and would electrolyze anodically. It is already known from DE-GM 75 08 084 to manufacture the contact carrier from a refractive metal that forms a protective anodic layer under certain electrochemical conditions. This renders superfluous the otherwise necessary coating of the contact carrier with a thermoplastic synthetic material. Suitable metals listed are titanium, niobium and tantalum. The protective anodic layer formed by titanium is not strong enough to create a coating that is stable over an extended period of time. Niobium and tantalum are expensive materials, and are difficult to obtain.

It is known from the prior art that the use of an extruded can as a contact piece, in which contact carriers are encased in a thermoplastic synthetic material, is necessary because this shape guarantees extensive coverage of the can with the thermoplastic synthetic material which, again, is necessary to provide reliable sealing of the contact carrier with respect to the electrolyte solution.

SUMMARY AND ADVANTAGES OF THE INVENTION

The apparatus according to the invention, comprises a contact element for transmitting current to a workpiece for use in electrochemical material working, with the contact element having a contact carrier and a contact piece which is secured to the contact carrier and comes in contact with the workpiece during operation; and wherein the contact carrier is comprised of zirconium alloy, and the contact piece is welded to an end face of the contact carrier. The contact element according to the invention has the advantage that zirconium is suitable for forming a stable, protective anodic layer.

The omission of the coating with the thermoplastic synthetic material also has the advantage that a solid contact piece can be welded to the contact carrier in the form of a simple wafer. Consequently, it is also possible, for example, to use harder alloys for the contact pieces.

BRIEF DESCRIPTION OF THE DRAWING

An embodiment of the invention is illustrated in the drawing and described in detail in the following description. The single FIGURE shows a schematic view of a contact element according to the invention.

DETAILED DESCRIPTION OF THE PREFERRED EMBODIMENT

A contact element 10 comprises a rotationally-symmetrical contact carrier 11, which has at one end a threaded connector pin 12 for connection of a current cable, not shown, and, at the opposite end, an end face 14 to which a contact piece 13 of precious metal is secured. It is, however, also conceivable to configure the contact carrier such that it can be inserted into a receptacle.

The contact carrier 11 comprises zirconium or a corresponding zirconium alloy. In the use of a sodium nitrate electrolyte, zirconium forms a protective anodic layer on the surface of the contact carrier 11 under electrochemical conditions. A drawn zirconium pin, for example, is used to produce the contact element 10; this pin is further processed on a lathe to achieve the shape of the contact carrier 11.

A solid disk, for example of platinum or a platinum alloy, is used as the contact piece 13; the diameter of the disk is kept smaller than, for example, the diameter of the end face 14 of the contact carrier 11. A suitable welding method is used to secure the contact piece 13 to the end face 14 of the contact carrier 11.

I claim:
1. A contact element for transmitting current to a workpiece for use in electrochemical material working, said contact element having a contact carrier and a contact piece which is secured to the contact carrier and comes in contact with the workpiece during operation; and wherein the contact carrier is comprised of zirconium or a zirconium alloy; and the contact piece is a solid wafer which is welded to an end face of the contact carrier.

2. A contact element according to claim 2, wherein the contact piece is a disk whose diameter is smaller than the diameter of the end face of the contact carrier.

3. A contact element according to claim 3, wherein the contact piece comprises platinum or a platinum alloy.

4. A contact element according to claim 2, wherein the contact piece comprises platinum or a platinum alloy.

5. A contact element for transmitting current to a workpiece for use in electrochemical material working, said contact element having a contact carrier and a contact piece which is secured to the contact carrier and comes in contact with the workpiece during operation; and wherein the contact carrier is comprised of zirconium or a zirconium alloy; and the contact piece comprises platinum or a platinum alloy and is welded to an end face of the contact carrier.

* * * * *